United States Patent
Rodriguez et al.

(10) Patent No.: US 8,509,472 B2
(45) Date of Patent: Aug. 13, 2013

(54) DIGITAL WATERMARKING METHODS, PROGRAMS AND APPARATUS

(75) Inventors: Tony F. Rodriguez, Portland, OR (US); John Stach, Tualatin, OR (US); Alastair M. Reed, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 2528 days.

(21) Appl. No.: 11/152,686

(22) Filed: Jun. 13, 2005

(65) Prior Publication Data

US 2006/0018507 A1 Jan. 26, 2006

Related U.S. Application Data

(60) Provisional application No. 60/582,914, filed on Jun. 24, 2004.

(51) Int. Cl.
*G06K 9/00* (2006.01)

(52) U.S. Cl.
USPC .......................................... 382/100; 348/578

(58) Field of Classification Search
USPC .......................................... 382/100; 348/578
See application file for complete search history.

(56) References Cited

U.S. PATENT DOCUMENTS

| | | | | |
|---|---|---|---|---|
| 6,020,931 | A * | 2/2000 | Bilbrey et al. | 348/584 |
| 6,411,725 | B1 * | 6/2002 | Rhoads | 382/100 |
| 6,579,324 | B1 * | 6/2003 | Lowry et al. | 715/243 |
| 7,127,615 | B2 * | 10/2006 | Moskowitz | 713/176 |
| 2002/0006212 | A1 * | 1/2002 | Rhoads et al. | 382/100 |
| 2002/0136455 | A1 * | 9/2002 | Lin et al. | 382/173 |
| 2003/0037075 | A1 * | 2/2003 | Hannigan et al. | 707/500 |
| 2004/0008866 | A1 * | 1/2004 | Rhoads et al. | 382/100 |

* cited by examiner

*Primary Examiner* — Matthew Bella
*Assistant Examiner* — Dennis Rosario (57) ABSTRACT

The present invention provides steganographic and digital watermarking methods and apparatus. In a first implementation, we provide methods and apparatus for steganographically conveying data in a facial image by subtly altering facial features relative to statistical norms. In a second implementation, we convey data through different patterns of a diffraction grating. In a third implementation, we convey a digital watermark orientation component by projecting the orientation component onto an object to be captured. In the case of blue-screen technology, we incorporate an orientation component into a blue-screen itself. This provides great convenience for digital animators when overlay graphics and animation. In a forth implementation, we provide an identification document including an electronic memory chip. The chip includes an image of a bearer of the identification document. The image is digitally watermarked to include information (e.g., a chip serial number or document number) that is carried by the identification document. Thus, the electronic memory chip is tied to the document.

17 Claims, 8 Drawing Sheets

DIGITAL WATERMARKING METHODS, PROGRAMS AND APPARATUS

RELATED APPLICATION DATA

This application claims the benefit of U.S. Provisional Patent Application No. 60/582,914, filed Jun. 24, 2004, which is hereby incorporated by reference.

TECHNICAL FIELD

The present invention relates generally to steganography and digital watermarking.

BACKGROUND OF THE INVENTION

Digital watermarking technology, a form of steganography, encompasses a great variety of techniques by which plural bits of digital data are hidden in some other object, preferably without leaving human-apparent evidence of alteration.

Digital watermarking may be used to modify media content to embed a machine-readable code into the media content. The media may be modified such that the embedded code is imperceptible or nearly imperceptible to the user, yet may be detected through an automated detection process.

There are many processes by which media can be processed to encode a digital watermark. In physical objects, the data may be encoded in the form of surface texturing or printing. Such marking can be detected from optical scan data, e.g., from a scanner or web cam. In electronic objects (e.g., digital audio or imagery—including video), the data may be encoded as slight variations in sample values. Or, if the object is represented in a so-called orthogonal domain (also termed "non-perceptual," e.g., MPEG, DCT, wavelet, etc.), the data may be encoded as slight variations in quantization values or levels. The assignee's U.S. Pat. Nos. 6,122, 403 and 6,614,914 are illustrative of certain watermarking technologies.

Digital watermarking systems typically have two primary components: an embedding component that embeds a watermark in the media content, and a reading component that detects and reads the embedded watermark. The embedding component embeds a watermark pattern by altering data samples of the media content. The reading component analyzes content to detect whether a watermark pattern is present. In applications where the watermark encodes information, the reading component extracts this information from the detected watermark.

One problem that arises in many watermarking applications is that of object corruption. If the object is reproduced, or distorted, in some manner such that the content presented for watermark decoding is not identical to the object as originally watermarked, then the decoding process may be unable to recognize and decode the watermark. To deal with such problems, the watermark can convey a reference signal or "orientation component." The orientation component is of such a character as to permit its detection even in the presence of relatively severe distortion. Once found, the attributes of the distorted reference signal can be used to quantify the content's distortion. Watermark decoding can then proceed—informed by information about the particular distortion present.

The Assignee's U.S. Pat. Nos. 6,614,914 and 6,408,082 detail orientation components, and processing methods, that permit such watermark decoding even in the presence of distortion.

To provide a comprehensive disclosure without unduly lengthening this specification, each of the U.S. patent documents cited in this specification are hereby incorporated by reference.

With the foregoing by way of background, the specification next turns to various digital watermarking improvements. It will be recognized that these improvements can typically be employed in many applications, and in various combinations with the subject matter of the patent documents cited herein. These improvements will be more readily apparent from the following detailed description, which proceeds with reference to the accompanying drawings.

DETAILED DESCRIPTION

Feature-Based Encoding

Introduction

One aspect of the present invention provides "feature-based" encoding. By "feature-based" we mean to say that our encoding relies upon manipulation of image features themselves, and not necessarily on changing value of underlying pixels or transform domain coefficients. For example, if the image includes a human face, we may choose to subtly alter a relationship between the nose and eyes to steganographically convey auxiliary data. In one implementation we subtly widen the nose, relative to the eyes, to convey binary data. In other implementations we subtly vary the ears or mouth relative to the eyes or nose to convey data. Some biometrics background is helpful.

Biometrics

Biometrics is a science of measuring and analyzing physiological characteristics, such as eye retinas and irises, facial patterns, hand geometry, and fingerprints. Some biometrics technologies involve measurement and analysis of behavioral characteristics, such as voice patterns, signatures, and typing patterns. Because biometrics, especially physiological-based technologies, measures qualities that an individual usually cannot change, it can be especially effective for authentication and identification purposes.

Systems and methods are known that are capable of analyzing digital images and recognizing human faces. Extraction of facial feature information has been used for various applications such as in automated surveillance systems, monitoring systems, human interfaces to computers, systems that grant a person a privilege (e.g. a license to drive or a right to vote), systems that permit a person to conduct a financial transaction, television and video signal analysis. For example, commercial manufacturers, such as Identix Corp of Minnetonka, Minn. (which includes Visionics Corp.) manufacture biometric recognition systems that can be adapted to be capable of comparing two images, such as facial images or fingerprint images. The IDENTIX FACE IT product may be used to compare two facial images to determine whether the two images belong to the same person. Other commercial products are available that can compare two fingerprint images and determine whether the two images belong to the same person. For example, U.S. Pat. Nos. 6,072,894; 6,111, 517; 6,185,316; 5,224,173; 5,450,504; and 5,991,429 further describe various types of biometrics systems, including facial recognition systems and fingerprint recognition systems, and these patents are hereby incorporated by reference in their entirety. Facial recognition has been deployed for applications such as surveillance and identity verification.

Some face recognition applications use a camera to capture one or more successive images of a subject, locate the subject's face in each image, and match the subject's face to a one or faces stored in a database of stored images. In some face recognition applications, the facial images in the database of stored images are stored as processed entities called templates. A template represents preprocessing of an image (e.g., a facial image) to a predetermined machine readable format. Encoding the image as a template helps enable automated comparison between images. For example, in a given application, a video camera can capture the image of a given subject, perform processing necessary to convert the image to a template, then compare the template of the given subject to one or more stored templates in a database, to determine if the template of the subject can be matched to one or more stored templates. The template may include a representation of the subject's facial features, including eyes, nose, mouth, jaw line, chin, depth of eye sockets, cheekbones, and relative distances or shapes/sizes of such. Other templates include mathematical representations of a face, e.g., based on Eigenvectors or based on 3-D facial models representing a face. Other templates include a so-called facial "fingerprint," which is based on points or relative relationships between different facial features. Other known facial detection systems have used methods such as facial color tone detection, texture detection, eigenfaces, template matching, knowledge or rule-base systems, feature extraction, or edge detection approaches.

Feature-Based Encoding

Facial recognition software can provide a listing of primary features, e.g., those features used to determine a facial recognition template. A listing or recognition of secondary features can also be provided or identified. We preferably use secondary features—those not needed for an accurate facial recognition—for our feature-based encoding.

Figure 1A:
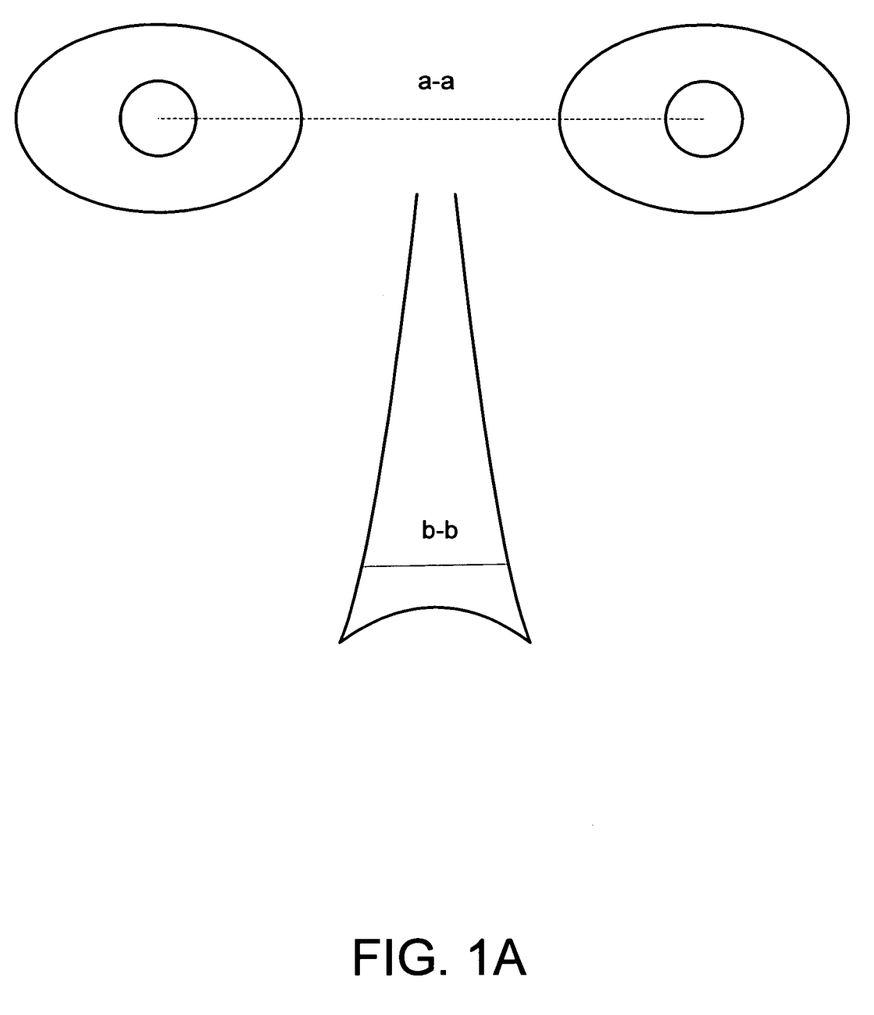
FIGS. 1A-1D are human facial representations helpful in illustrating feature-based encoding.
Figure 1B:
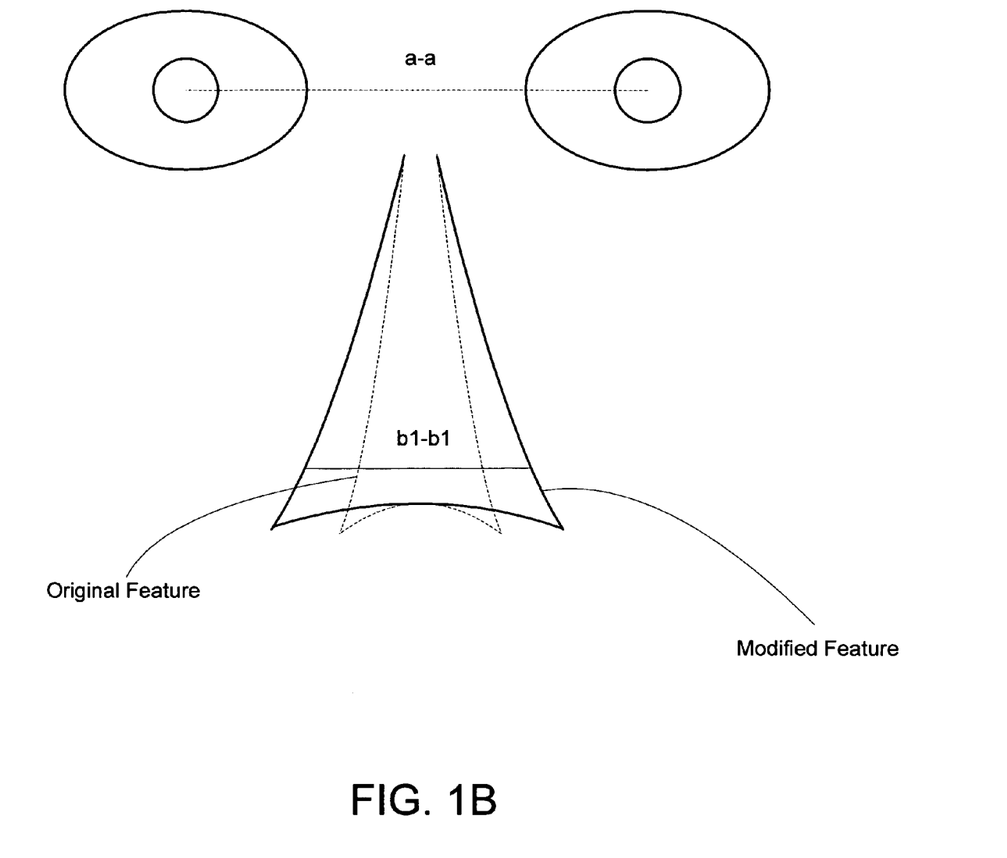
Figure 1C:
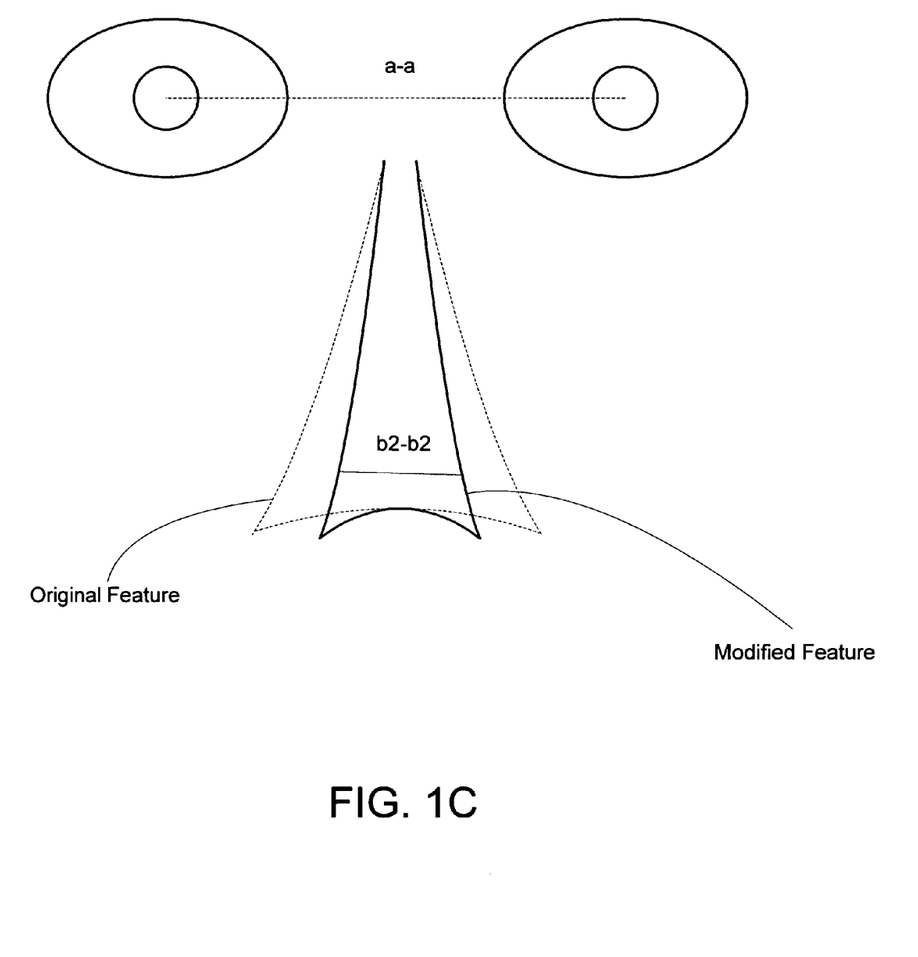

A representation of a human face is shown in FIG. 1A. We suppose that the width of the nose at cross-line b-b is a secondary feature. We further suppose, e.g., from statistical analysis of a large pool of human faces, that for a given race, sex and approximate age, the nose width b-b relative to an eye distance a-a falls within a predetermined statistical range. That is, for a given race, sex and approximate age, we know that a person with an eye distance of X (a-a line) should statistically have a nose width falling between Y and Z (b-b line). We subtly alter the width of the nose at b-b relative to the eye distance a-a to convey auxiliary data. For example, we widen the distance to b1-b1 to convey a binary 1 (FIG. 1B), or shorten the distance to b2-b2 to convey a binary 0 (FIG. 1C). While subtle, the variation is preferably sufficient to be statistically relevant and thus detectable. (Of course, the figures are exaggerated to ease the discussion.)

An automated reader determines a nose-width distance, relative to the eyes, and sees if the nose-width distance at a predetermined location falls outside of a statistic norm. If the nose-width does fall outside of the norm, the width is analyzed to determine what auxiliary data it conveys.

Figure 1D:
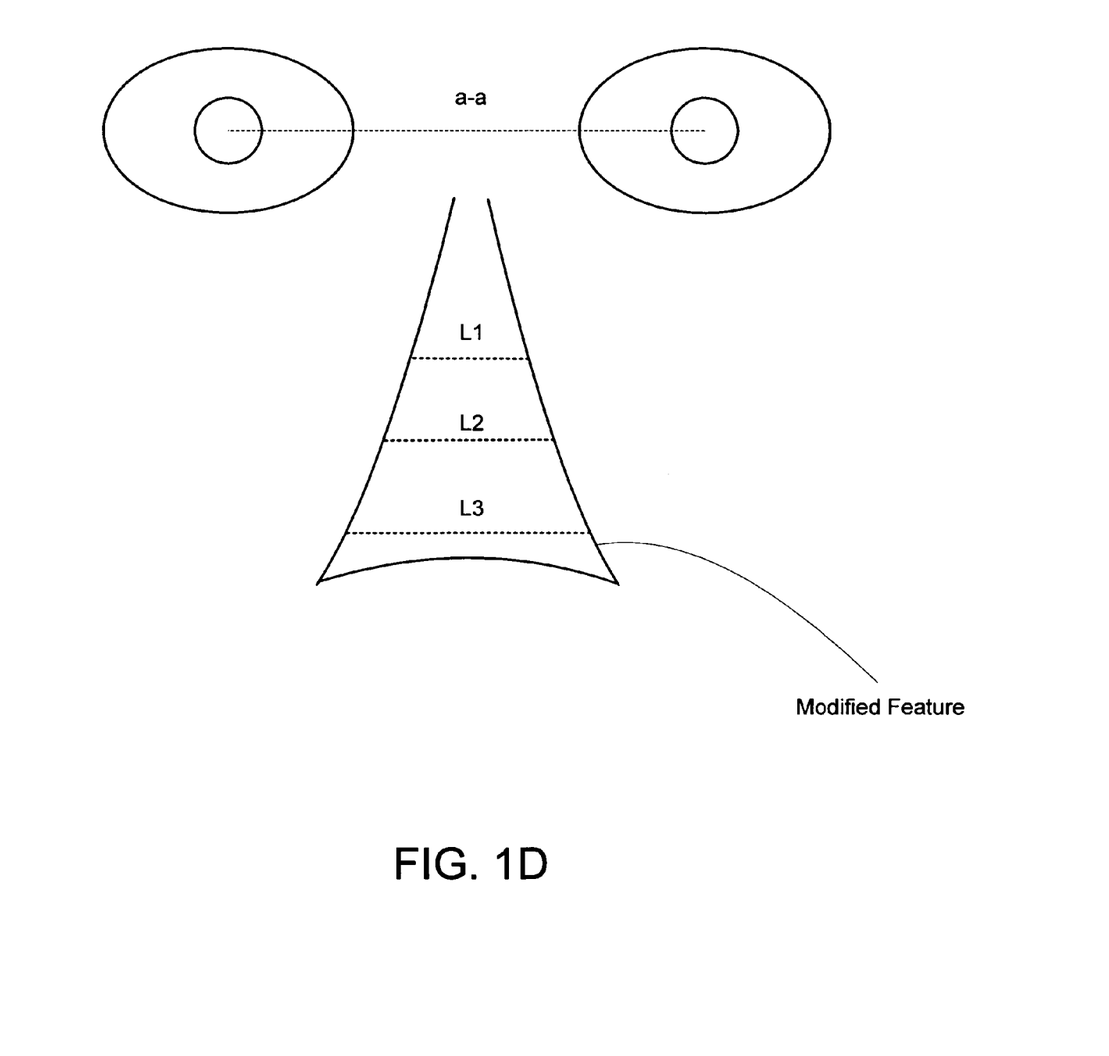

The nose can be segmented into predetermined widths lines L1, L2 and L3 (e.g., shown in FIG. 1D). In this implementation, the different widths convey different auxiliary data at different locations. Each predetermined width line can be check, if desired, against an excepted statistical norm, to determine whether the width indicates the presence of auxiliary data. Modifying multiple features, with use of redundant data embedding, helps ensure that encoding is robust against facial anomalies (e.g., robust against a face that falls significantly outside of statistical norms).

We preferably use a plurality of secondary features to convey auxiliary data. For example, we elongate one or more earlobes relative to a primary feature (e.g., eye distance). Or we can subtly alter a subject's lips or dimples relative to statistical norms to convey auxiliary data.

Secondary features, altered relative to one another, can also be used to steganographically convey auxiliary data. For example, changing size and/or shape of a nose relative to size and/or shape of ears can be used to convey data.

(Changing the shape or size of facial features can be readily accomplished with commercial digital image editing software. Edge and line detection algorithms can be employed to precisely identify and then modify secondary features. Of course, modifying features to convey data is preferably an automated process.).

Feature-based encoding can be used to evidence that a face has been captured and a corresponding template has been generated therefrom. Feature-based encoding evidences such processing the next time the face image is encountered.

We can combine feature-based encoding with digital watermarking. For example, a human face includes first data digitally watermarked therein, and second data conveyed through feature-based encoding. We can even use digital watermarking to announce an expected presence of feature-based encoding. Once announced, predetermined locations can be analyzed to obtain the auxiliary data. Feature-base encoding and a digital watermark can also be cross-correlated. That is, data carried by feature-based encoding can be correlated to or redundant with data carried by digital watermarking.

While the above discussion has focused on faces, our techniques can be applied to other images as well. Consider motor vehicles, for example. A security camera captures video of a parking garage. Pattern recognition software is employed to identify models and makes of the various cars parked therein. For example, the pattern recognition software identifies a mini-van as a Toyota Sienna and a truck as a Ford F-150. Like a face, the pattern recognition software keys in on primary features (e.g., length vs. door size, or body shape, etc.).

We can subtly alter secondary features in a digital image of the vehicles to steganographically convey data. For example, we can subtly alter a wheel well relative to body length or relative to its known relationship to the vehicle. Or we can alter a window size, mirror location, etc. The changes are subtle enough so that the pattern recognition software will still correctly identify the cars. But the subtle changes are sufficient to convey auxiliary data. These changes are machine-discernable through a comparison of expected feature relationships vs. actual measured feature relationships.

The auxiliary data can be used to convey a time/date stamp, a geo-location, a camera and/or operator identifier.

Watermarking in Multiple Spectra

Holograms and other optical variable devices (OVD) may include a so-called "diffractive grating." Generally, a diffractive grating is a pattern (often microscopic) of lines (e.g., etches, rules, shapes, cuts or grooves) which bends light, so as to make a 2D rainbow-color design or image from light. The grating yields different designs according to different viewing or illumination angles. We convey unique digital watermarks at these different angles or designs, so that a corresponding watermark is only perceptible when detected at a corresponding angle or from a design corresponding to a particular angle. A diffraction grating can be designed to providing a plurality of digital watermarks, each being detected at its own unique viewing angle.

Figure 2A:
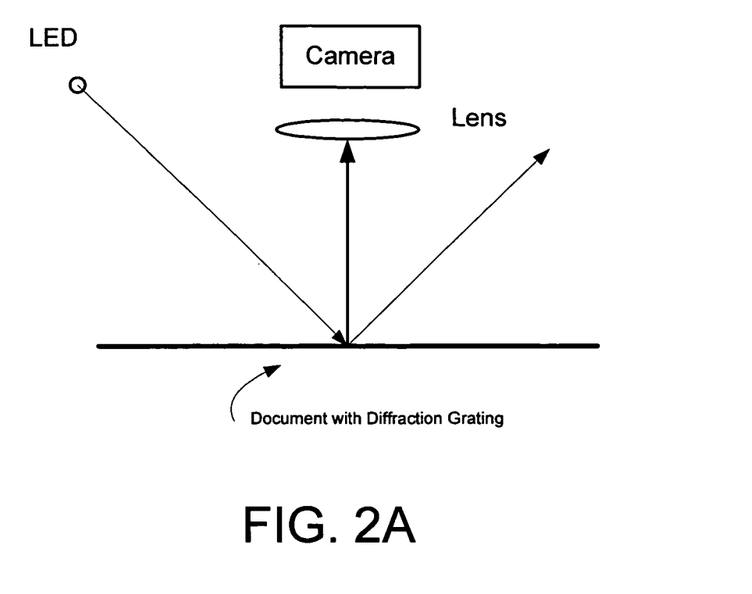
FIGS. 2A-2B illustrate diffraction gratings and related detection.
Figure 2B:
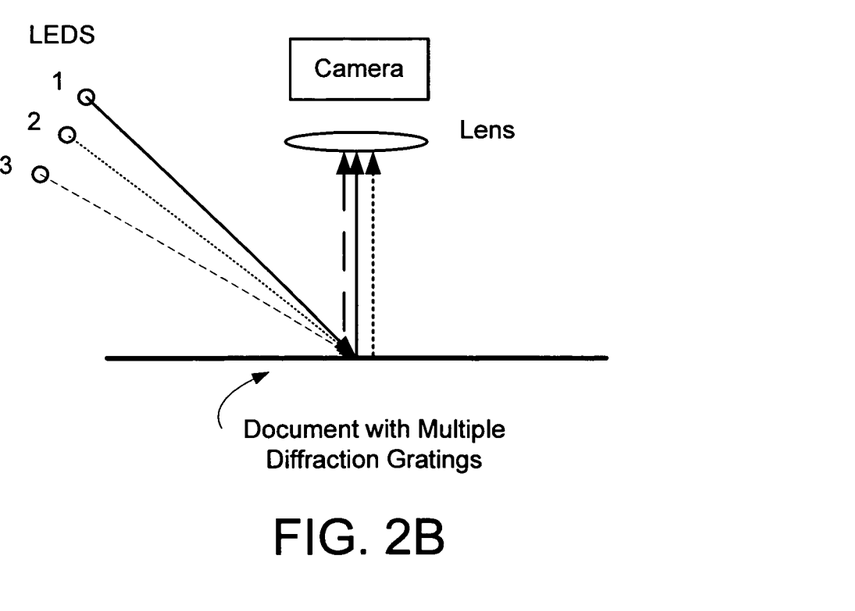

FIGS. 2A and 2B illustrate detection of digital watermarks from diffraction gratings. The basic layout for detecting whether a document even contains a diffraction grating is shown in FIG. 2A. If a LED emits light at a particular wavelength and is at a correct illumination angle, light will be diffracted by a grating of a particular ruling and detected by a camera (represented by a solid line). If any of these elements is not correct (e.g., the illumination or view angle is off), the light will be diffracted at a different angle and will not be detected by the camera. For example, if a diffraction grating is not present, specular reflection will occur as shown by the dotted line in FIG. 2A (with specular reflection, an angle of incidence equals an angle of reflection). A corresponding image or design generated by a grating at a particular angle, perhaps with illumination at a particular wavelength, is designed or ruled to convey a digital watermark, which is detectable through analysis of the optical data capture by the camera shown in FIG. 2A.

Such a system is very difficult to counterfeit, as an exact grating would have to be reproduced to recreate a watermark at a particular angle. This is even further complicated when a grating conveys multiple watermarks, each perceptible only when illuminated and view at a unique angle.

This basic idea can be extended to more than one LED and multiple gratings as shown in FIG. 2B.

Wavelength and position of LED 1 are selected so that light is returned to the camera by a corresponding first diffraction grating pattern (represented by the dashed line in FIG. 2B). Similarly the wavelength and position of LED 2 are selected so that light is returned to the camera by a second diffraction grating pattern (represented by the solid line in FIG. 2B). And the wavelength and position of LED 3 are selected so that light is returned to the camera by a third diffraction grating pattern (represented by the dotted in FIG. 2B). If the angle of illumination or view is off, the grating yields specular reflection and no light is received by the camera, for any of LED 1, 2 or 3. Each of the first, second and third grating patterns can produce a unique image or design. Each image or design preferably conveys a unique digital watermark component.

In alternative implementations, instead of separate watermarks, a machine readable watermark is generated through addition or subtraction of images. For example, a watermark is generated that is only readable when LED 1, 2 and 3 illuminate the document together—producing a composite image or design. Each component includes a portion of the watermark needed for detection. Or, as a further alternative, a watermark is generated that requires cycling through the LED's and creating 3 images which must be added or subtracted to obtain a valid watermark.

Of course, the number of LED's and grating pattern could also be increased to more than three.

Figure 3:
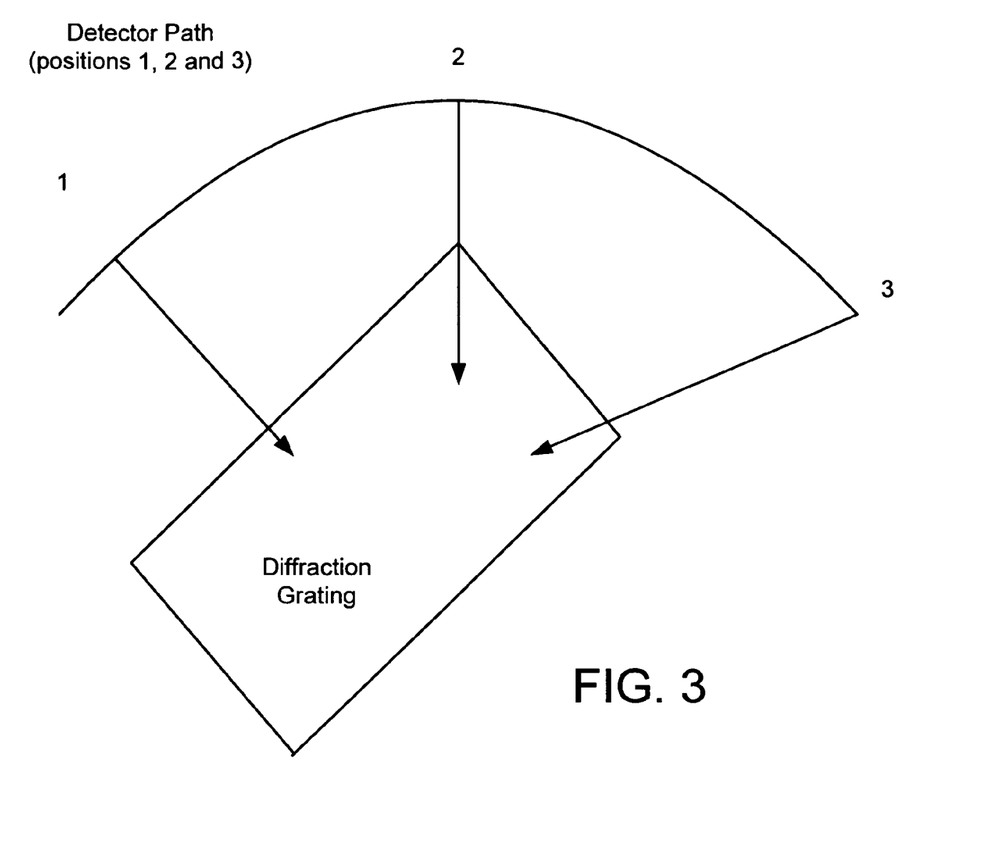
FIG. 3 illustrates multiple detection positions for an object including one or more diffraction gratings.

A related implementation adds a function of time to watermark detection. With reference to FIG. 3, a detector illuminates a document including a grating with three different grating patterns at positions 1, 2 and 3. These positions correspond with unique grating patterns that yield a unique watermark component. The watermark components must be collected in sequence (or in time) in order to yield an authentic read. Thus, authentication is dependent on spatial position (e.g., viewing and illumination angles) and time.

Projecting a Watermark Orientation Component

Watermark Orientation Component

A digital watermark can include a plurality of different components. One such component is a so-called "orientation" component. An orientation component helps to make a watermark more robust to geometric distortion (e.g., scaling, rotation, etc). Together, a watermark message (or "payload") and an orientation watermark signal form one type of digital watermark signal.

One form of watermark orientation component is an image signal that comprises a set of quasi-impulse functions in a transform domain, like a Fourier magnitude domain, e.g., each with pseudorandom phase. To detect rotation and scale of a watermarked image (e.g., after printing and scanning of the watermarked image), a watermark decoder converts the watermarked image to the Fourier magnitude domain and then performs, e.g., a log polar resampling of the Fourier magnitude image. A generalized matched filter correlates a known orientation signal with the re-sampled watermarked signal to find the rotation and scale parameters providing the highest correlation. The watermark decoder performs additional correlation operations between the phase information of the known orientation signal and the watermarked signal to determine translation parameters, which identify the origin of the watermark message signal. Having determined the rotation, scale and translation of the watermark signal, the reader then adjusts the image data to compensate for this distortion, and extracts a watermark message signal, if any.

Projecting a Watermarking Orientation Component

An orientation component is traditionally embedded in content via a watermark embedder (see, e.g., assignee's U.S. Pat. No. 6,614,914). Instead of embedding an orientation component with a watermark embedder, one alternative improvement projects an orientation component onto a subject or scene to be captured. The watermark orientation component is then introduced as part of image (or video) capture.

In a first implementation, we provide a flash or backlight that strobes or illuminates (or is filtered) to convey an orientation component. The flash projects the orientation component onto a subject, which is captured by a camera (e.g., CCD array). A watermark embedder can embed a message or payload in alignment with the orientation component that is captured along with the image.

Instead of a flash, a filter can be placed over the CCD array, which introduces an orientation component to all captured imagery.

An orientation component is helpful in resolving image distortion, and in determining relative positioning of depicted objects. As such, an orientation component is used to determine whether an image has been altered. For example, a crime scene investigator (or insurance adjuster) takes a picture of a crime scene with a camera including an orientation component-enabled flash. The orientation component provides a relative orientation for the captured image. If the image is altered, the orientation component will similarly be altered at the image areas that are changed. Analysis of the orientation component can be used to identify the tampering. See, e.g., assignee's U.S. Published Patent Application No. U.S. 2004-0181671 A1.

An orientation can be used to provide depth information as well. For example, the orientation component can provide a relative spatial distance or relationship, which is useful in determining and distinguishing foreground objects from background objects, etc.

Digital Animation Aided by Orientation Components

Now consider digital animation. In today's magical world of special effects, actors perform scenes in front on "blue" screens—a blank backdrop common to most whether reports. Digital animator's later fill-in a blue-screen background with wildly imaginative digital animation. An improvement is to include an orientation component on the blue screen itself. The orientation component can be provided by subtly varying, e.g., coloration, brightness or texture of a blue-screen. Captured imagery of the blue-screen includes a representation of the orientation component. Analysis of the orientation component (decoded from the captured imagery) is then used to provide relative depth, spatial distances and orientation for later digital animation. These distances and relationships can be automatically determined. The orientation component removes distance and spatial relationship guesswork for the digital animator. With relative spatial relationships being automatically determined, digital animation software can clue off of the spatial information to enhance and simplify animation. For example, digital animation, computer graphics or overlay video can be spatially (or temporally) aligned and placed in video sequences based on information (e.g., scale, rotation, depth, etc.) garnished from the orientation component.

An actor can wear a costume, clothing or specialized suit that also includes a steganographic orientation signal. The signal can be provided through stitching or subtle coloring or patterns on the clothing. Relative depth between the blue screen and an actor (or relative depth between multiple actors or steganographically marked objects) is determined via the various orientation components. Digital animation or graphics are more easily tailored to the actors actual, relative position based on position information provided through the orientation components.

Sharing Computer Resources for Digital Watermarking

Bob walks into his favorite sandwich shop to grab a quick bite before catching the 6:00 pm shuttle to LAX. While waiting for his sandwich and fries, Bob pulls out his handheld to check email. The sandwich shop provides a wireless hotspot, and at any given time there are ten or so wireless devices that make up a local network. Bob's handheld steps through the necessary network logon negotiation. Bob's done this before, it seems relatively seamless now. Each of the devices is identified by name, and each device determines whether to allow interaction with the other local devices through their local network settings.

Bob has a lot of email to review. Some of the email includes attachments including digitally watermarked images. Decoding the watermarks may take some time, since the images are large. Besides, Bob wants to surf the web to check the status of his flight.

Enter our improvements.

A first improvement is a protocol and software application that allows Bob's handheld device to communicate with other local devices to determine whether they are watermark enabled. That is, do any of the other local devices include watermark embedders and/or detectors. (The devices can include a watermark enabled indicator in their network security profile. Sharing limits can be established to allow limited interaction with other devices or work share watermarking tasks.) The software application identifies two devices that include such watermark capabilities. One of the devices is a printer that is idle for most of the day, as it sits waiting for a print job representing "official" sandwich shop business. Bob's software application wirelessly inquiries whether the two devices have any spare processing capabilities, and it turns out for this example, both device do have spare capabilities. Bob's software application routes the images or portions of the images to the two devices, and requests that they decode the digital watermarking embedded therein. The two devices comply and return the embedded information. The parallel processing techniques disclosed in assignee's U.S. Published Patent Application No. U.S. 2002-0120849 A1 can be advantageously combined here to help distribute imagery for parallel processing.

Our improvements extend beyond watermark detection and embedding. For example, Bob's handheld is busy crunching numbers. (Bob is trying to find the next digit of PI). The software application on Bob's device offloads other mundane tasks to devices in the local network that have spare processing cycles. For example, Bob offloads an internet database query to a cooperating local device.

Work sharing is virtually seamless. Once an operator sets up their network access to allow work sharing, their device can automatically accommodate other device's needs. If the processing requirements of any device increases, the device can announce such to an originating device, and shut down or postpone the task.

Watermarking Imagery Stored in Electronic Memory on an Identification Document

The assignee has filed several patent applications directed to securing identification documents with digital watermarks. Some of these disclosures also envision and disclose so-called smartcards, e.g., documents including electronic memory and/or electronic processing circuitry. For example, please see, e.g., U.S. Pat. Nos. 5,841,886, 6,389,151, 6,546,112, 6,608,911, Published Patent Application Nos. U.S. 2002-0009208 A1 and U.S. 2003-0178495 A1, and U.S. patent application Ser. No. 10/893,149 (published as U.S. 2005-0063027 A1) and Ser. No. 10/686,495 (published as U.S. 2004-0181671 A1). Each of these patent documents is herein incorporated by reference. Related implementations are discussed below.

Figure 4:
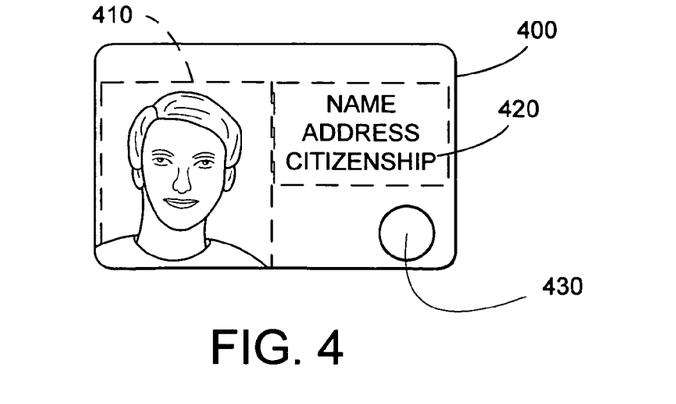
FIG. 4 illustrates an identification document including electronic memory.

With reference to FIG. 4 we embed a digital watermark in an image stored on electronic memory circuitry of an identification document. The image preferably corresponds to an authorized bearer of the document. For example, the document 400 illustrated in FIG. 4 represents an identification document, such as a passport book, visa, driver's license, etc. Document 400 includes a photographic representation 410 of an authorized bearer (also referred to as "printed image") of the document 400, printing 420 on a surface of the document and integrated circuitry (e.g., a chip) 430. The chip 430 can include both electronic memory and processing circuitry. Chip 430 can be passive (e.g., no internal power supply) or active (e.g., including its own power supply). While the chip is preferably contactless, document 400 can include a contact-type chip as well. Suitable chips are known in the art, e.g., those complying with ISO standards 14443 and 7816-4.

In one implementation, the integrated circuitry 430 includes an image stored therein. The image is preferably compressed, e.g., as a JPEG file, to help conserve memory space. The stored image preferably corresponds to printed image 410, or a reduced bit representation of printed image 410. The image includes digital watermarking embedded therein.

The digital watermark is preferably cross-correlated with information corresponding to the document, integrated circuitry and/or the authorized document bearer.

For example, the chip 430 may include a serial number (e.g., 96 bits) that is stored in static memory on the chip. The serial number, or a hash (e.g., reduced-bit representation) of the serial number, is used as a digital watermark message component. The hash or serial number is embedded in the photographic image stored on the chip 430.

The serial number can be combined with a document number as shown in Table 1: Watermark Message, below:

TABLE 1

Watermark Message

| Chip Serial Number or Hash | Document Number or Hash |
| --- | --- |

The combined message is steganographically embedded in the stored image. Thus, the chip and document are tied together via digital watermarking. If the chip is replaced, moved to another document or simulated, the changes can be identified by validating the serial number or document number that should be embedded in the image stored on chip 430. Similarly, if the printed image 410 is altered or replaced, it may not include the necessary watermark message (e.g., chip serial number) embedded therein.

Document verification can be automated. For example, a serial number is read from static memory (e.g., via a smart-card reader) and a watermarked image is similarly retrieved and decoded. The serial number and watermark message are compared to see if they correspond as expected. If the document number is used as a watermark message component, it can be input (e.g., via reading OCR-B text, barcode, magstrip or manual entry) for comparison as well.

Instead of a document number or serial number, any other text or message carried by printing, barcode, magstripe, etc. can be used as a watermark message component.

Returning to FIG. 4, printed image 410 can be steganographically embedded with data as well, e.g., in the form of a digital watermark. The digital watermarking is preferably cross-correlated with information carried by the chip 430. For example, a watermark embedded in printed image 410 may include a chip serial number or hash thereof. In some cases, where memory capacity of chip 430 is limited and may not include a stored image but still includes a serial number, the printed image 410 watermark provides a link between the chip and the document.

In still other implementations, a first watermark in printed image 410 is linked to a second watermark embedded in a stored image on chip 430. The linkage can be accomplished in several different ways. For example, each watermark includes a redundant version of information, e.g., such as a serial number, document number or information printed on or carried by (e.g., a barcode) the document. In another example, the first digital watermark includes a key to decode or decrypt the second digital watermark (or vice versa). In still another example, a first message portion is carried by the first digital watermark, and a second message portion is carried by the second digital watermark. Concatenating the two message portions is required for proper authentication of identification document 400. Another example includes a third digital watermark printed elsewhere on the identification document (e.g., in a background pattern, graphic, ghost image, seal, etc.). All three digital watermarks are linked or cross-correlated for authentication.

In still further implementations, a different biometric image or template is stored in the chip, instead of a photographic image. For example, the biometric may include a fingerprint image or retinal scan. Such biometrics can be watermarked and linked to the document as discussed above.

Figure 5A:
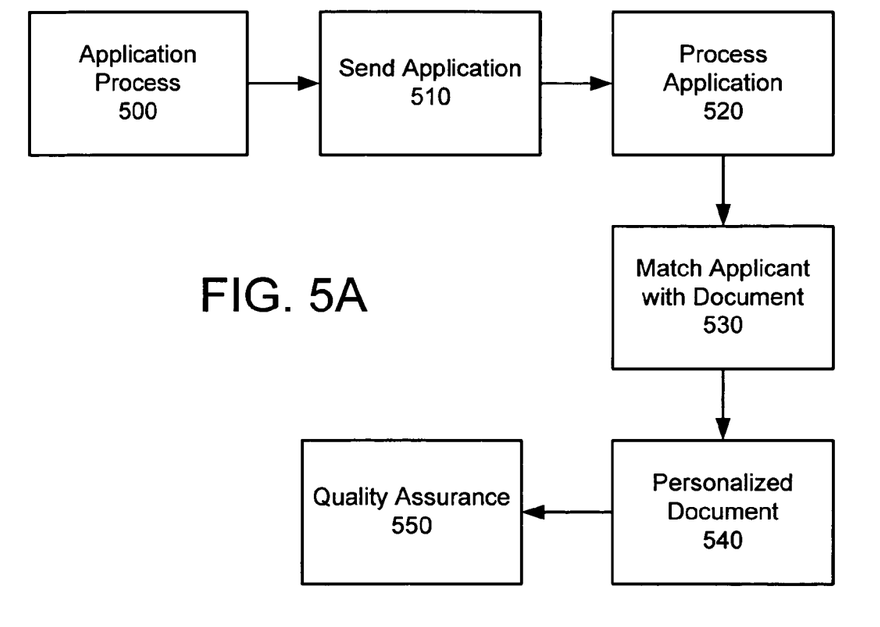
FIG. 5A illustrate an identification document issuance processes.
Figure 5B:
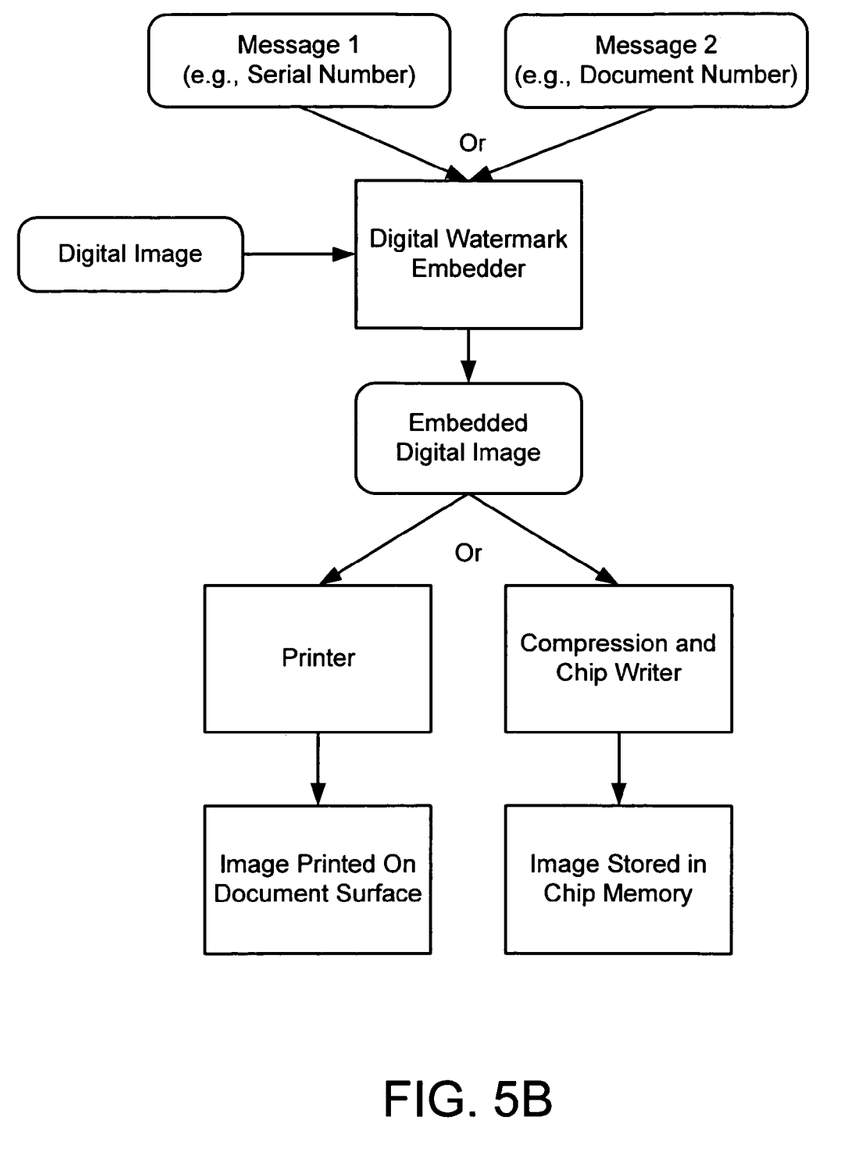
FIG. 5B illustrates a related digital watermarking process.

An example work flow for document production is shown in FIG. 5A and FIG. 5B. An applicant for an identification document (e.g., a passport) fills out an application and provides a photograph (step 500). The application is submitted to a processing agency (e.g., state department, step 510), which processes the application (step 520). Of course the application can be mailed or electronically submitted. Application processing may include background checks, including a check of relevant databases to ensure that the applicant is not fraudulently trying to obtain the identification document. If the application is approved, a document is created for the applicant. In the case of a passport, a blank "book" is obtained. The blank book includes a book (hereafter "document") number. The document number is matched with the applicant or applicant's file (step 530). In most cases, the book will include a chip already affixed (or integrated with) thereto. If not, the chip can be attached or integrated with the document at a later stage. The document is personalized to identify the applicant (step 540). For example, the document is printed with variable information (e.g., name, address, sex, eye color, birth date, etc.). The variable information, or portions thereof, is also stored as a barcode or stored in a magstripe or on chip. A photographic representation is also printed (or attached) on the document and stored in the chip.

With reference to FIG. 5B, a digital image representing the applicant is provided to a watermark embedder. (If the applicant provided a physical picture, the picture is optically scanned and a digital representation is provided to the watermark embedder.). Messages (e.g., a chip serial number read from static memory or document number, etc.) are input to the embedder. The watermark embedder embeds a desired message in a copy of the digital image. The embedded, digital image is compressed and then stored on the chip. If desired, a second message can be embedded in another copy of the digital image, and then printed on a document surface. (Of course, in some implementations, the same embedded image, including the same message, is both printed on the document and stored on-chip.).

Returning to FIG. 5A, the document production process optionally includes a quality assurance step 550, where the document is inspected. For example, any machine-readable features (e.g., OCR, barcode, magstripe, digital watermark, optical memory, electronic chip storage) are read and inspected to see if they match expected information. Any cross-correlation relationships (e.g., between first and second digital watermarks) can be tested as well. A quality assurance operator may also visually inspect the document.

A few possible combinations based on this section include (but are not limited to) the following:

A1. An identification document comprising:

an electronic memory chip, wherein the electronic memory chip comprises a serial number stored therein, the serial number uniquely identifying the electronic memory chip, wherein the electronic memory chip further comprises a digital image representing an authorized bearer of the identification document, and wherein the digital image comprises first digital watermarking embedded therein, and wherein the first digital watermarking comprises a representation of the serial number;

a first surface area including text printed thereon, wherein the text comprises at least one of a name and an identification document number; and a second surface area comprising a photographic image printed thereon, wherein the photographic image comprises a representation of the authorized bearer of the identification document.

A2. The identification document of A1 wherein the first digital watermarking comprises a reduced-bit representation of the serial number.

A3. The identification document of A2, wherein the first digital watermarking further comprises a representation of the identification document number.

A4. The identification document of A1 wherein the photographic image printed on the second surface area comprises second digital watermarking.

A5. The identification document of A4 wherein the first digital watermarking and the second digital watermarking are interdependent.

A6. The identification document of A5 wherein the second digital watermarking comprises a key to decode or decrypt the first digital watermarking.

A7. The identification document of A5 wherein the first digital watermarking comprises a key to decode or decrypt the second digital watermarking.

A8. The identification document of A4 wherein the first digital watermarking and the second digital watermarking comprise information that is redundant with or correlated to each other.

A9. The identification document of any one of A1-A8, wherein the identification document comprises at least one of a driver's license and passport.

A10. The identification document of A4 wherein the identification document comprises a third surface area including third digital watermarking thereon.

A11. The identification document of any one of A1-A10 wherein the digital image comprises a compressed form in the electronic memory chip.

A12. The identification document of any one of A1-A11 wherein the electronic memory chip comprises electronic processing circuitry.

B1. An identification document comprising:
an electronic memory chip,
wherein the electronic memory chip comprises a serial number stored therein, the serial number uniquely identifying the electronic memory chip, and
wherein the electronic memory chip further comprises a digital image stored therein, wherein the digital image comprises first digital watermarking embedded therein;
a first surface area including text printed thereon, wherein the text comprises at least one of a name and an identification document number; and
a second surface area comprising a printed image or graphic, wherein the printed image or graphic comprises second digital watermarking embedded therein, and
wherein the first digital watermarking and the second digital watermarking are cross-correlated for authenticating the identification document.

B2. The identification document of B1, wherein the first digital watermarking and the second digital watermarking are cross-correlated by including redundant or correlated information.

B3. The identification document of B2 wherein the information comprises at least a representation of the serial number.

B4. The identification document of B3 wherein the information further comprises at least a representation of the document number.

B5. The identification document of B1 wherein the first digital watermarking and the second digital watermarking are cross-correlated through decoding or decrypting keys.

B6. The identification document of B1 wherein the digital image comprises a biometric of an authorized bearer of the identification document.

CONCLUSION

The foregoing are just exemplary implementations of the present invention. It will be recognized that there are a great number of variations on these basic themes. The foregoing illustrates but a few applications of the detailed technology. There are many others.

The section headings in this application are provided merely for the reader's convenience, and provide no substantive limitations. Of course, the disclosure under one section heading may be readily combined with the disclosure under another section heading.

To provide a comprehensive disclosure without unduly lengthening this specification, the above-mentioned U.S. patent documents are hereby incorporated by reference. The particular combinations of elements and features in the above-detailed embodiments are exemplary only; the interchanging and substitution of these teachings with other teachings in this application and the incorporated-by-reference U.S. patent documents are expressly contemplated.

Many of the above-described methods and related functionality can be facilitated with computer executable software stored on computer readable media, such as electronic memory circuits, RAM, ROM, EPROM, flash memory, magnetic media, optical media, magnetic-optical media, memory sticks, hard disks, removable media, etc., etc. Such software may be stored and/or executed on a general-purpose computer, or on a server for distributed use. Also, instead of software, a hardware implementation, or a software-hardware implementation can be used.

In view of the wide variety of embodiments to which the principles and features discussed above can be applied, it should be apparent that the detailed embodiments are illustrative only and should not be taken as limiting the scope of the invention.

What is claimed is:

1. A method comprising:
capturing imagery including one or more objects in front of a green or blue-screen backdrop, wherein the green or blue-screen backdrop comprises a first steganographic orientation component embedded therein, wherein the first steganographic orientation component helps make a watermark robust to geometric distortion, wherein the captured imagery includes a representation of the first steganographic orientation component, and wherein the first steganographic orientation component is machine-readable from analysis of the captured imagery;
determining a relative depth or a spatial distance between one of the one or more objects and the green or blue-screen backdrop via the first steganographic orientation component and a second steganographic orientation component, wherein the one of the one or more objects comprises the second steganographic orientation component thereon; and
aligning graphic data with the captured imagery based upon the first steganographic orientation component.

2. The method of claim 1, wherein the first steganographic orientation component comprises digital watermarking.

3. The method of claim 1, wherein the aligning graphic data with the captured imagery is based on at least one of a scale, rotation or depth of the first steganographic orientation component.

4. The method of claim 1, further comprising placing the graphic data in the captured imagery based upon the alignment.

5. The method of claim 1, wherein the one of the one or more objects comprises a costume or clothing.

6. The method of claim 1, wherein the alignment is a spatial alignment.

7. The method of claim 1, wherein the alignment is a temporal alignment.

8. The method of claim 1, wherein the green or blue-screen backdrop encodes the first steganographic orientation component through subtle variations of coloration or brightness of the green or blue-screen backdrop.

9. A system comprising:
a camera configured to:
capture imagery including one or more objects in front of a green or blue-screen backdrop, wherein the green or blue-screen backdrop comprises a first steganographic orientation component embedded therein, wherein the first steganographic orientation component helps make a watermark robust to geometric distortion, wherein the captured imagery includes a representation of the first steganographic orientation component, and wherein the first steganographic orientation component is machine-readable from analysis of the captured imagery; and
one or more processors configured to:
receive the captured imagery;
determine a relative depth or a spatial distance between one of the one or more objects and the green or blue-screen backdrop via the first steganographic orientation component and a second steganographic orientation component, wherein the one of the one or more objects comprises the second steganographic orientation component thereon; and
align graphic data with the captured imagery based upon the first steganographic orientation component.

10. The system of claim 9, wherein the first steganographic orientation component comprises digital watermarking.

11. The system of claim 9, wherein the one or more processors are configured to align graphic data with the captured imagery is based on at least one of scale, rotation or depth of the first steganographic orientation component.

12. The system of claim 9, wherein the one of the one or more objects comprises a costume or clothing.

13. The system of claim 9, further comprising placing the graphic data in the captured imagery based upon the alignment.

14. The system of claim 9, wherein the alignment is a spatial alignment.

15. The system of claim 9, wherein the alignment is a temporal alignment.

16. A non-transitory computer-readable medium having instructions stored thereon, the instructions comprising:
instructions to receive captured imagery, wherein the captured imagery comprises one or more objects in front of a green or blue-screen backdrop, wherein the green or blue-screen backdrop comprises a first steganographic orientation component embedded therein, wherein the first steganographic orientation component helps make a watermark robust to geometric distortion, wherein the captured imagery includes a representation of the first steganographic orientation component, and wherein the first steganographic orientation component is machine-readable from analysis of the captured imagery;
instructions to determine a relative depth or a spatial distance between one of the one or more objects and the green or blue-screen backdrop via the first steganographic orientation component and a second steganographic orientation component, wherein the one of the one or more objects comprises the second steganographic orientation component thereon; and
instruction to align graphic data with the captured imagery based upon the first steganographic orientation component.

17. The non-transitory computer-readable medium of claim 16, wherein the instructions to align graphic data with the captured imagery reference at least one of scale, rotation or depth of the first steganographic orientation component.

* * * * *